United States Patent [19]
Morgan

[11] 3,981,569
[45] Sept. 21, 1976

[54] EYEGLASS STRUCTURE

[76] Inventor: J. Robert Morgan, Palmer's Hill Road, Old Greenwich, Conn. 06830

[22] Filed: Dec. 16, 1974

[21] Appl. No.: 533,126

[52] U.S. Cl. ................................................. 351/47
[51] Int. Cl.² ............................................ G02C 9/04
[58] Field of Search .................. 351/47, 52, 57, 49

[56] References Cited
UNITED STATES PATENTS

| | | | |
|---|---|---|---|
| 1,647,626 | 11/1927 | Hopson | 351/47 X |
| 1,752,889 | 4/1930 | Cornwell et al. | 351/47 |

FOREIGN PATENTS OR APPLICATIONS

| | | | |
|---|---|---|---|
| 984,285 | 7/1951 | France | 351/49 |
| 1,092,829 | 11/1967 | United Kingdom | 351/49 |

*Primary Examiner*—Paul A. Sacher
*Attorney, Agent, or Firm*—Eugene E. Geoffrey, Jr.

[57] ABSTRACT

An eyeglass structure which includes a rear frame having circular portions joined by a nose piece and temple supports and two individual front portions rotatably carried by said circular positions with at least one pair of said portions carrying light modifying elements therein.

5 Claims, 8 Drawing Figures

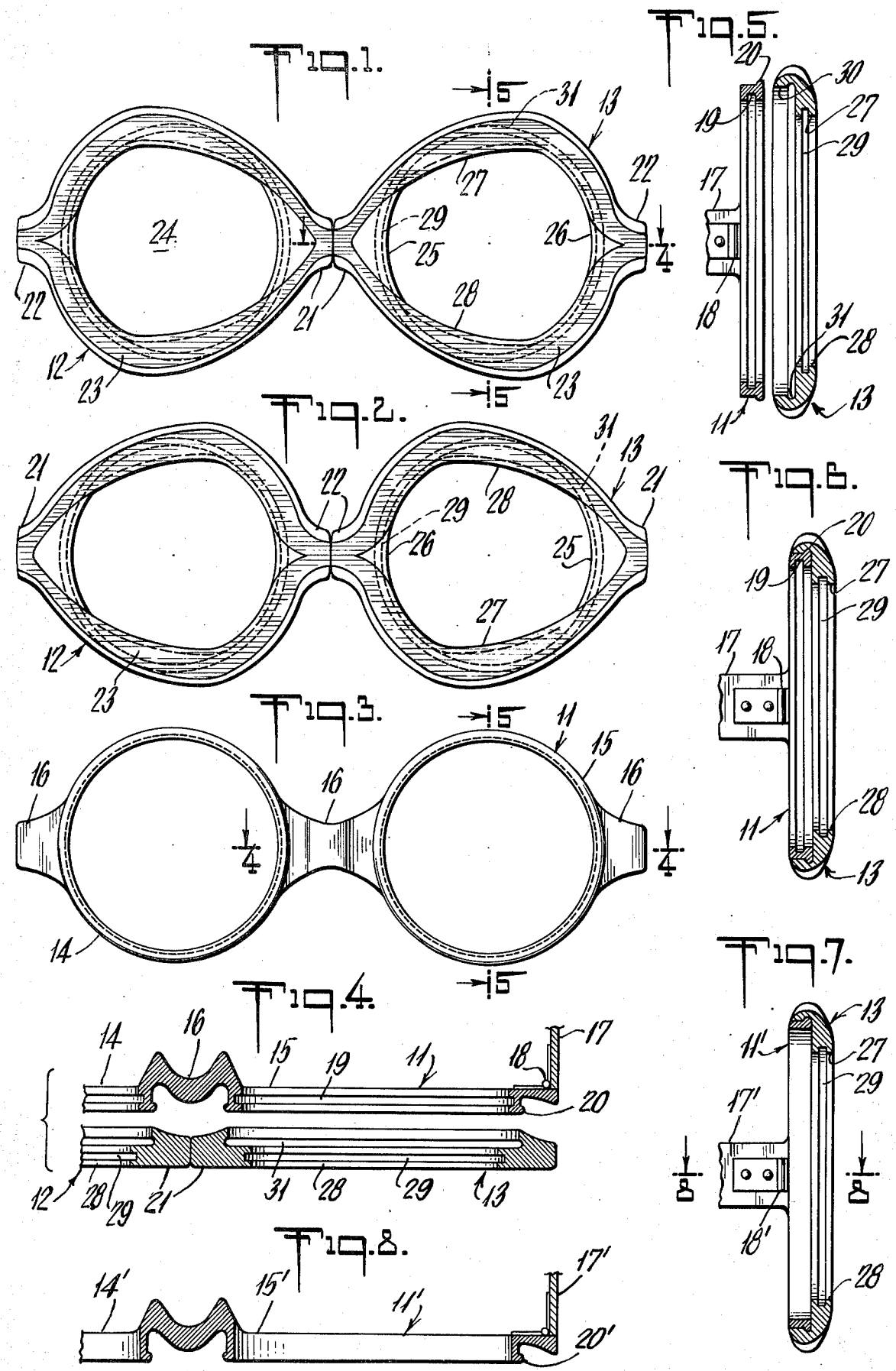

EYEGLASS STRUCTURE

This invention relates to eyeglasses embodying a lens frame and temples or supporting elements for engaging the ears and more specifically, to a novel and improved composite lens frame which is adjustable to provide a plurality of ornamental effects and at the same time, permits adjustment of the lenses to modify the optical characteristics thereof.

Eyeglasses generally consist of a pair of lens holders of annular or other configuration for firmly retaining the lenses, a nose piece coupling the holders and temples hinged to the outer edges of the holders to engage the ears in order to support the structure on the head of the user with the lenses properly positioned relative to the eyes. Many eyeglass structures have been proposed utilizing rotatable lenses, but in such cases the lens holders are restricted to a circular configuration. This invention while affording means for rotation of the lenses, provides a novel and improved structure wherein a variety of ornamental effects may be achieved, and frame colors can be modified without involving the expense of a plurality of glasses.

Another object of the invention resides in the provision of a novel and improved eyeglass structure embodying lens holders and overlying elements releasably secured to the holders and rotatable to produce a variety of ornamental effects.

Still another object of the invention resides in the provision of a novel and improved eyeglass structure wherein a combination of lenses may be employed for modifying optical effects such as color, light transmission, focal lengths and the like.

The eyeglass structure in accordance with the invention includes a rear frame structure carrying the temples or supports for engagement with the ears, and individual front structural portions removably engaging the rear frame structure to provide the desired ornamental effect and which may be rotated relative to the rear frame. Lenses may be carried by either or both of the rear frame structure and the front structural portions to obtain various optical and ornamental effects.

The above and other objects and advantages of the invention will become more apparent from the following description and accompanying drawings forming part of this application.

In the drawings:

FIG. 1 is a front elevational view of the front portions of one embodiment of an eyeglass structure in accordance with the invention.

FIG. 2 is an elevational view similar to FIG. 1 showing the front portions shifted in position to produce a modified ornamental effect.

FIG. 3 is a front elevational view of the rear portion of the eyeglass structure in accordance with the invention which is adapted to receive and rotatably support the front portions shown in FIGS. 1 and 2.

FIG. 4 is an exploded cross-sectional view of FIGS. 1 and 3 taken along the lines 4—4 thereof.

FIG. 5 is an exploded cross-sectional view of FIGS. 1 and 3 taken along the lines 5—5 thereof.

FIG. 6 is a view similar to FIG. 5 with the portions assembled.

FIG. 7 is a cross-sectional view similar to FIG. 6 but showing a modified rear structural portion, and FIG. 8 is a cross-sectional view of the rear structural portion of FIG. 7 taken along the lines 8—8 thereof.

The eyeglass structure in accordance with the invention comprises a rear frame structure having a pair of circular elements for retaining lenses and connected by a nose bridge. Temples or supports are carried by the outer edges of the circular elements. The outer peripheries of the circular elements have means for removably retaining front ornamental portions which can also be rotated in position to produce various ornamental effects. Various lens arrangements may also be employed such as corrective lenses in the rear frame portion and colored lenses in the front ornamental portions. If the colored lens is not required, replacement front portions without lenses may be substituted therefor. Similarly, the rear frame portion may not include lenses, and corrective lenses or merely colored lenses may be mounted in the front portions. When the corrective lenses are of the bifocal type they can of course, be mounted in the front portions and rotated to shift the relative positions of the lens portions when desired.

More specifically, and with reference to FIGS. 1 through 6 the improved eyeglass structure comprises a rear frame portion 11 (FIG. 3) and front portions 12 and 13 (FIGS. 1 and 2), the latter normally being of similar configuration and color. The rear frame portion or structure includes two circular lens receiving ring-shaped elements 14 and 15 coupled by a nose bridge 16 that may be integrally formed therewith. Each element 14 and 15 includes an outwardly extending portion 16 each having a temple or support 17 attached thereto by a hinge 18 in the conventional manner. The elements 14 and 15 are each provided with an inner annular recess 19 for receiving a lens and an outer peripheral ridge 20 for releasably engaging cooperating front portions 12 (13).

The front portions 12 and 13 may have any desired ornamental configuration and color and are preferably arranged with an outer contour that will permit them to be rotated through angles of 180 degrees to modify the ornamental effect. In the illustrated embodiment of the invention, each front portion while having a non-uniform outer contour includes uniformly shaped opposing end sections 21 and 22 so that an end section of one front portion will meet an end section of the other front portion to give the appearance of a unitary structure. The outer edges of the end sections 21 and 22 have a slight curvature to permit rotation of the front portions 12 and 13 and the darkened portions 23 of the front portions may either be raised or contoured areas, or may have a color differing from the remainder thereof to provide the ornamental effects.

The opening 24 in each front portion 12 and 13 is defined by four intersecting curved portions namely 25 and 26 which are circular and coincident with the inner edge of the corresponding read frame portion 14 or 15 as the case may be. The remaining curved portions 27 and 28 are of a larger radius and fall within the area of the corresponding rear frame portion. The edge, as defined by the arcuate segments 25 through 28, has a groove 29 to receive an appropriate lens, though in cases where a lens is not to be used the groove 29 may be omitted. The back face of each front portion is recessed as indicated by the numeral 30 and has an inner peripheral groove 31 to receive the ridge 20 on the rear frame portion.

With the eyeglasses thus far described the rear frame portion 11 constitutes the support for the overlying front portions 12 and 13 which completely cover the rear portion and are rotatable relative thereto. This structure is particularly advantageous in that a variety of lens arrangements may be utilized and a single rear frame having corrective lenses may be used with a number of sets of front portions of differing colors and ornamentation which may or may not include colored or light polarizing lenses. In the case of bifocal lenses, they may be mounted in the front frame portions to permit rotation thereof to shift the relative positions of the lens portions of different focal lengths.

A modified embodiment of the invention is shown in FIGS. 7 and 8 and like numerals are utilized to denote corresponding elements in both embodiments. In the form of the invention illustrated in FIGS. 7 and 8 the rear frame portion 11' has circular portions 14' and 15' which do not include provision for mounting lenses. The portions 14' and 15' do however have the peripheral ridges 20' for engaging front portions 12 and 13.

The embodiments of the invention described above provide the advantages of lens and frame adjustability while at the same time giving the appearance of conventional eyeglasses. For instance by forming the front and rear frame portions of a clear material and having an overlay of colored material 23 the effect of a unitary structure can be achieved. If desired a similar effect can be achieved by forming the entire front portions 12 and 13 of colored plastic. Further the specific ornamental design shown in the drawings may be modified to provide a variety of ornamental effects and both geometric and free-form shapes may be utilized. Conventional shapes may also be employed while still affording the advantages of adjustability and modification of lens arrangements. With more exotic configurations it may be desirable to position the lenses at a shallow angle so that the front frame portions will not interfere one with the other during rotation. Another aspect of the invention may involve use of the nose bridge 16 as part of the ornamentation rather than to have the front portions completely overlie it as illustrated in the drawings.

While only certain embodiments of the invention have been illustrated and described, it is understood that alterations, changes and modification may be made without departing from the spirit and scope thereof as defined by the appended claims.

What is claimed is:

1. An eyeglass structure comprising a rear frame structure including a pair of circular portions connected by a nose bridge and a pair of temple supports and means for attaching them to the outer edges of said circular portions, each circular portion having an annular outwardly extending peripheral ridge adjoining the front edge thereof, a pair of substantively identical front portions each having an opening therein coordinated with the opening in one of said circular frame portions, at least the rear portion of the opening in each front portion being circular and having an annular recess in the wall thereof for removably receiving one of said annular ridges to rotatably secure the front portion to said frame, each of said front portions having similar outwardly extending elements on opposite sides thereof to overlie a portion of the nose bridge and temple attaching means, the configuration of said front portions and outwardly extending elements being coordinated with the configuration of said rear frame structure and completely overlying and covering said rear frame structure and said nose bridge and temple supports to produce the effect of a unitary structure when said front portions are in selected adjusted positions relative to said rear frame structure with said elements overlying said nose bridge and temple supports and light modifying lenses carried by at least one pair of said portions whereby said elements when in said selected positions, position said light modifying lenses in the desired relationship for cooperation with the eyes.

2. An eyeglass structure according to claim 1 wherein each of said circular portions on said frame includes an annular groove on the inner surface thereof for receiving and holding a lens.

3. An eyeglass structure according to claim 1 wherein each of said front portions includes a second annular groove on the inner surface thereof and disposed forwardly of the first said groove for receiving and holding a light modifying element.

4. An eyeglass structure according to claim 1 wherein each of said circular portions of said frame includes an annular groove on the inner surface thereof for receiving and holding a lens and wherein each of said front portions includes a second annular groove on the inner surface thereof and disposed forwardly of the first said groove for receiving and holding a light modifying element.

5. An eyeglass structure according to claim 1 wherein a portion of the opening in each front portion has a contour differing in configuration from the contour of said circular portions.

* * * * *